(No Model.)

J. GULDEN.
BEARING FOR TURBINE SHAFTS.

No. 471,694. Patented Mar. 29, 1892.

WITNESSES:
E. B. Bolton
C. C. Champion

INVENTOR:
Julius Gulden
By Richards &
his Attorneys.

UNITED STATES PATENT OFFICE.

JULIUS GULDEN, OF BUDA-PESTH, AUSTRIA-HUNGARY.

BEARING FOR TURBINE SHAFTS.

SPECIFICATION forming part of Letters Patent No. 471,694, dated March 29, 1892.

Application filed December 10, 1890. Serial No. 374,161. (No model.)

*To all whom it may concern:*

Be it known that I, JULIUS GULDEN, a subject of the King of Hungary, residing at Buda-Pesth, Austria-Hungary, have invented certain new and useful Improvements in Bearings for the Shafts of Turbines, of which the following is a specification.

Heavily-charged vertical shafts as often used with turbines, especially when having a large circumferential speed, offer great difficulties with regard to the mode of suspending the same. In some cases it is usual to employ with turbines the Fontaine head-pan for the upper gudgeon, and in other cases an annular bell-shaped bearing with which said gudgeon is suspended. The first arrangement offers the disadvantages that the pressure per square inch of the pressed surface of the bearings becomes extremely high, as the diameter of said bearing cannot be augmented over certain limits, and that the bearing is absolutely inaccessible while in motion, and that automatic lubrication of the pan is not reliable. The present invention intends to provide bell-shaped bearings with an efficacious mode of lubricating and discharging the surface of the bearings, and also to provide means for distributing the weight of the shaft on two or more bearings.

Figure 2:
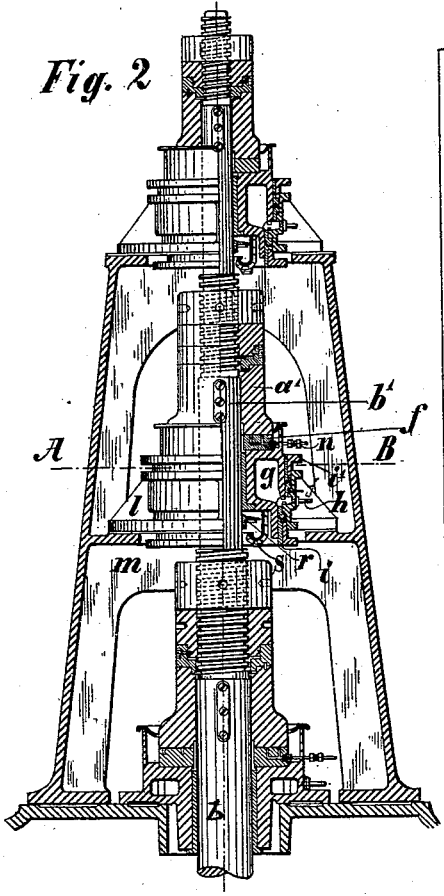
Figure 3:
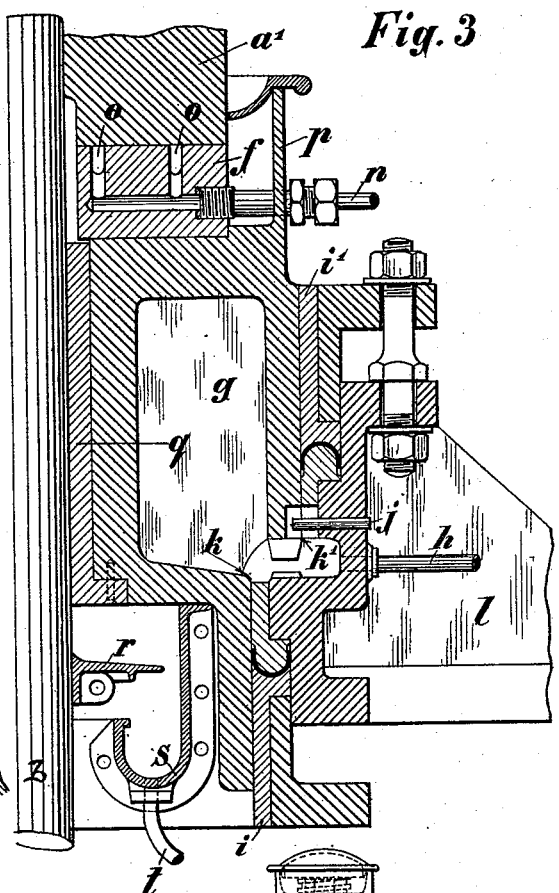
Figure 4:
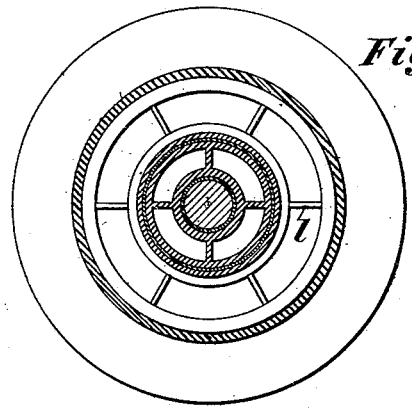
Figure 1:
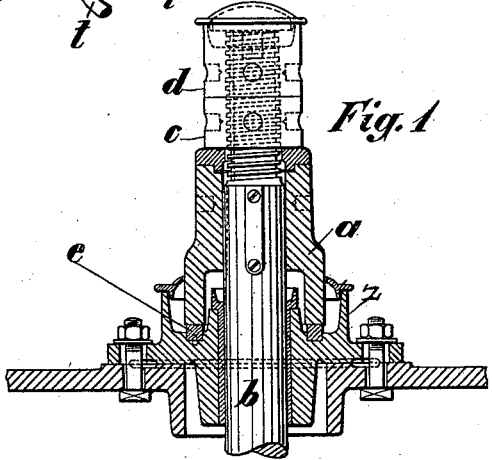

Reference now being had to the drawings, Figure 1 is a vertical section showing the usual form of turbine shafts and journals. Fig. 2 is a vertical section showing a turbine shaft and bearings embodying my improvements. Fig. 3 is an enlarged sectional view showing a form of the improved bearing in detail. Fig. 4 is a plan view of the same, taken on line A B, Fig. 2.

The bell-shaped bearings as used with the turbines of Gane & Co., of Buda-Pesth, are shown in Fig. 1. The bell-shaped bearing $a$ is connected with the shaft $b$ in such a way as to permit the bearing to move along the shaft $b$, without permitting, however, another rotation except with the shaft $b$. The screw-nuts $c$ $d$ carry the weight of the shaft and of such parts hanging on the same, allowing, also, the adjusting of the shaft in the vertical direction. The bell-shaped bearing $a$ is rotated on the brass step $e$, located in an iron box $z$, forming, also, an oil-box around the same. Grooves may be made on the surface of the brass step $e$ to allow the introducing of oil on the rotating surfaces. This arrangement is, according to my long experience, satisfactory as long as the product resulting from the pressure of the weight in pounds per square inch multiplied by the mean speed per second in feet does not exceed two thousand two hundred; but when this coefficient is higher than that number, by means of my invention the weight of the shaft is distributed on several bearings, Fig. 2.

According to my invention the brass step $f$, upon which the bearing $a'$ rests, is not lodged in a fixed box, as the brass step $e$ in Fig. 1, but it rests on a plunger $g$, which is held in suspension in the box $l$ by hydraulic pressure resulting from an accumulator. The pressing water enters through the pipe $h$ and is retained by the stuffing-boxes $i$ $i'$. The hydraulic pressure tending to raise the plunger $g$ results from the pressure exerted upon the areas $k$ $k'$, the plunger $g$ being secured against rotation by the bolt $j$, Fig. 3, and by this arrangement connected with the box $l$, such arrangement permitting, however, the plunger $g$ to move in a vertical direction. The box $l$ is secured to the frame $m$. By regulating accordingly the dimensions of the areas $k$ $k'$, Fig. 3, as well as the degree of the pressure of the water, it is possible to exert on the plunger $g$ and at the same time on the bell-shaped bearing $a'$ such an upward pressure as is necessary to transmit a certain part of the weight of the shaft on the bell-shaped bearings. This arrangement affords the possibility of using two or more bell-shaped bearings on the same shaft, one of the same being on a fixed frame $m$, while the other or others are suspended by hydraulic pressure, and of distributing the weight on each bearing in such a way as to attain the above-named coefficient, the like for each one and all the bearings, this coefficient being the measure for the degree of charging of the bearings, as from this coefficient the degree of the labor of friction is dependent. Such a uniform sustaining of the weight of the shaft on several bell-shaped bearings placed vertically one above the other and resting on a fixed frame could be made only by adjusting-screws and with great difficulties, and it would happen that in consequence of the uneven wear and tear of the brass steps the required distribution of the weight would not remain constant.

The second mode of sustaining the weight of the shaft in my invention consists in pressing oil between the bell-shaped bearings and the step $f$, Figs. 2 and 3, through the pipe $n$. This pipe is screwed on the step $f$ and tightened. The oil enters through the annular grooves $o\ o$ below the bearing under such a high pressure that it raises the bearing, though but little, and that the oil is removed away automatically. This arrangement affords an admirable lubricating, the bearing rotating indeed continually on a layer of oil. The oil flowing away outside of the step is caught up by a pot $p$ and conducted thence by suitable pipes to a suitable filter, (not shown,) where it may be cleaned and made ready to be used again. The oil which moves to the inside of the step $f$ flows downward between the lining $q$ and the shaft and is thrown out by the ring $r$ in order to be caught up by the oil-cup $s$, being thence conducted by the tube $t$ to a suitable filter, as above.

What I claim is—

1. In a turbine with a vertical shaft, the means for distributing the weight of the shaft and parts hanging on the same, consisting in the combination of a vertical bearing $a'$, keyed on the shaft in such a way as to permit it to move along the shaft, but without permitting other rotation, except together with the shaft itself, the step $f$, the plunger $g$, water-conducting pipe $h$, stuffing-boxes $i\ i'$, fixing-bolt $j$, box $l$, and frame $m$, for the purpose and in the manner as described and shown.

2. In a turbine with a vertical shaft, the combination, with the lubricating-pot $p$, the lining $q$, ring $r$, oil-cup $s$, and oil-conducting tube $t$, of the oil-conducting pipe $n$ and the grooves $o\ o$ in the step $f$, for the purpose and in the manner described and shown.

In witness whereof I have hereunto signed my name in the presence of two subscribing witnesses.

JULIUS GULDEN.

Witnesses:
  ADOLF D. WEISS,
  CARL WEINGARTEN.